US00RE38534E

(19) United States
(12) Reissued Patent
Huang et al.

(10) Patent Number: US RE38,534 E
(45) Date of Reissued Patent: Jun. 15, 2004

(54) EXTRUSION DIE

(75) Inventors: Yean-Jenq Huang, Santa Fe Springs, CA (US); Yen-Chieh Huang, Young-Ho (TW); Shu-Hua Chang, Young-Ho (TW)

(73) Assignee: Altech International Limited, Wanchai (HK)

(21) Appl. No.: 10/010,151

(22) Filed: Nov. 2, 2001

Related U.S. Patent Documents

Reissue of:
(64) Patent No.: 5,974,850
Issued: Nov. 2, 1999
Appl. No.: 09/018,352
Filed: Feb. 4, 1998

(62) Division of application No. 08/647,579, filed on May 13, 1996, now Pat. No. 5,756,016.

(51) Int. Cl.[7] ..... B21C 31/00
(52) U.S. Cl. ..... 72/271; 72/269; 72/467; 76/107.4
(58) Field of Search ..... 72/253.1, 254, 72/269, 271, 467; 76/4, 107.1, 107.4

(56) References Cited

U.S. PATENT DOCUMENTS

| | | | | |
|---|---|---|---|---|
| 3,527,079 A | | 9/1970 | Braeuninger | |
| 4,223,548 A | | 9/1980 | Wagner et al. | |
| 4,493,229 A | | 1/1985 | Stewart et al. | |
| 4,736,656 A | | 4/1988 | Futamura | |
| 4,751,651 A | | 6/1988 | Bryan | |
| 5,095,734 A | | 3/1992 | Asher | |
| 5,454,250 A | | 10/1995 | Ikeda et al. | |
| 5,490,408 A | | 2/1996 | Ando et al. | |
| 5,608,637 A | | 3/1997 | Wang et al. | |
| 5,870,922 A | * | 2/1999 | Rodriguez et al. | 72/271 |
| 6,004,489 A | | 12/1999 | Huang et al. | |
| 6,153,131 A | | 11/2000 | Huang et al. | |

FOREIGN PATENT DOCUMENTS

| | | |
|---|---|---|
| DE | 906 925 | 3/1954 |
| DE | 34 14994 A1 | 10/1985 |
| JP | 4-41014 | 2/1992 |
| JP | 06254619 | 9/1994 |
| SU | 0706149 | 12/1979 |

* cited by examiner

*Primary Examiner*—Ed Tolan
(74) *Attorney, Agent, or Firm*—Sand & Sebolt

(57) ABSTRACT

An extrusion die (10) includes a die body (30) having an upstream face (32) and a downstream face (34) with an extrusion profile (22) passing through the body (30) from the upstream face (32) to the downstream face (34). The walls of the extrusion profile (22) being the bearing (46) of the die (10). A pocket (40) having tapered sidewalls (70) is formed in the upstream face (32) of the die (10) and surrounds the extrusion profile (22). The configuration of the pocket (40) improves the material flow through the die (10). The configuration of the pocket (40) depends on the configuration of the extrusion profile (22). The width of the pocket (40) is small at the fast areas of the extrusion profile (22) while being large at the slow areas of the extrusion profile (22). The pocket (40) alters the entry angle of material as it enters the die (10) thus reducing friction in the die (10) and allowing increased extrusion speeds. In conjunction with the pocket (40), the die (10) has a continuous bearing (46) having the length depending on the configuration of the extrusion profile (22).

17 Claims, 5 Drawing Sheets

EXTRUSION DIE

Matter enclosed in heavy brackets [ ] appears in the original patent but forms no part of this reissue specification; matter printed in italics indicates the additions made by reissue.

CROSS REFERENCE TO RELATED APPLICATIONS

This application is a Divisional Application of currently pending U.S. patent application Ser. No. 08/647,579, filed on May 13, 1996, now U.S. Pat. No. 5,756,016 the disclosures of which are incorporated herein by reference.

TECHNICAL FIELD

The present invention relates generally to extrusion dies and a method for designing extrusion dies. More particularly, the present invention relates to a method for designing and manufacturing an extrusion die that permits faster extrusion speeds. Specifically, the present invention relates to an aluminum extrusion die having a variable, continuous bearing and a pocket that cooperate to improve material flow into the die to allow faster extrusion speeds.

BACKGROUND OF THE INVENTION

Extrusion is the process of forcing material through a die having an extrusion profile to form a product having a cross section that matches the extrusion profile. The length of the extruded product is determined by the amount of material forced through the die. A typical aluminum window frame may be fabricated from extruded rails and stiles. A typical rail or stile has a relatively complicated cross section including a plurality of arms extending from a common spine. Additionally, each of the arms may have a plurality of members extending therefrom. In the past as the extrusion profile became more complex, the speed of the extrusion process had to be reduced to maintain a high quality product.

A depiction of a typical extrusion die known in the art may be seen in FIG. 1. The prior art extrusion die, indicated generally by the numeral 210, generally includes a die body 212 having an upstream face 214 and a downstream face 216 with a cavity 218 extending toward the upstream face 214 from the downstream face 216. An extrusion profile 220 is cut from the upstream face 214 through the die body 212 to the cavity 218. A wall 222 parallel to the upstream 214 and downstream 216 faces extends between the extrusion profile 220 and the cavity 218. This wall 222 can also be referred to as the undercut 222 of the die 210. The depth of the extrusion profile 220 is referred to in the art as the die land or the die bearing 224. The die land or bearing 224 is the portion of the die 210 that the material contacts as it is force through the die 210. Such contact causes friction that creates heat and negatively affects material flow.

The length of the bearing 224 and the length of the undercut 222 affect the strength of the die 210. The strength of the die 210 is important because the die 210 is subjected to high pressures and high temperatures during the extrusion process. If the material surrounding the extrusion profile 220 is weak, the quality of the product is negatively affected. To increase the strength of the die 210, a longer bearing 224 and a small undercut 222 may be used. A long bearing 224, however, decreases the speed of the die 210 because of the friction created by the long bearing 224.

Thus, it is desirable to minimize the length of the bearing so that the maximum extrusion speed may be achieved while maintaining adequate strength for the die. Maximizing extrusion speed is extremely important to the extrusion industry because a die may be used to create miles of product over its lifetime. Thus, even a small increase in extrusion speed yields large benefits to the manufacturer.

Another feature of known dies 210 is a cavity 230 formed in the upstream face 214 of the die 210 to facilitate consecutive billets. Consecutive billets are required when the desired length of the product is longer than the capacity of the extrusion processor. To allow consecutive billets, a cavity 230 is carved out of the upstream face 214 of the die 210 around the extrusion profile 220. When the ram of the extrusion processor approaches the upstream face 214 of the die 210, the billet is cut and a portion of the extrusion material remains in the cavity 230. When the billet is cut, the act of cutting creates a force that tends to pull the material remaining in the cavity 230 back out of the die 210. To prevent the material from being pulled entirely out of the cavity 230, the cavity 230 is relatively deep. The depth is such that the angle indicated by the numeral 232 is typically less than 45 degrees. The depth of the cavity 230 prevents the cutting force from pulling the material all the way out of the die 210. Once the material is cut, the ram is then pulled back and another billet is inserted. The new billet welds itself to the material left over in the cavity and the extrusion process is continued.

The depth of the cavity 230 negatively effects the performance of the extrusion die 210. When the angle 232 formed by a line normal to the upstream face 214 at the corner of the cavity 230 and a line taken through that corner and the corner of the extrusion profile 220 and the bottom 234 of the cavity 230 is less than 45 degrees, the flow through the die 210 is restricted. As the material is forced against the die 210 in the extrusion processor, areas of material are forced into the corners and essentially stay in the corners during the extrusion process. This area is known as a dead area of flow and is indicated generally by the numeral 236 in FIG. 1. The dead area 236 creates friction between the rest of the flow and itself. A deep cavity 230 causes an additional dead area to form, as indicated by the numeral 238. The deep cavity 230 also acts as an additional length of bearing where the flow may flow against the cavity walls, as indicated by the numeral 240. The additional friction created by the dead area 238 and the extra bearing 240 is undesirable because it creates heat which degrades the surface finish of the final product. To reduce the affects of friction, the extrusion processor is run at slower speeds.

To design such a conventional die, a die designer typically relies on a trial and error method. The success of the die design often depends on the knowledge and experience of the die maker. A die is currently manufactured by first determining the desired profile of the final extruded product. The profile is then cut out of the die body. When the die designer first cuts the profile, the designer intentionally leaves the bearing longer than desired so that bearing length may be removed. If needed, after a test run. The die is then placed in an extrusion processor and run through a series of tests. If the die functions properly, the die is then used to create final products. A problem with this method is that the bearing of the die has been left intentionally long and the die must be run at slow speeds.

If the designer discovers problems with the die during the test runs or desires a faster die bearing, the designer takes the die out of the processor and makes adjustments. The magnitude of these adjustments often depends on the knowledge and experience of the designer. One typical adjustment that may be made is the removal, or shortening of the bearing.

The known methods for removing bearing are to shorten the entire bearing or to shorten a portion of the bearing to create a stepped bearing. Once this has been done, the die is repositioned and additional tests are performed. One problem with creating a stepped bearing is that a die having a stepped bearing forms a product with surface lines at the location of the bearing step. Such lines are undesirable and must be removed by a further process.

The reconfigurations and tests are repeated until a satisfactory product and extrusion speed are attained. It should be noted that bearing length cannot be added back to the die after it has been removed. Thus, if too much bearing is removed, the die must be scrapped and the process repeated. For this reason, the die bearing is always left longer than necessary. The added length causes the extrusion processes to be run slower than possible. Even a knowledgeable die designer with significant experience typically requires approximately three tests to create a satisfactory die. The number of runs and the labor required to perfect the die undesirably increases the costs of forming the die.

SUMMARY OF THE INVENTION

It is therefore, a primary object of the present invention to provide a method for accurately designing and forming an extrusion die that may be run at a higher speed in an extrusion processor.

It is another object of the present invention to provide an extrusion die, as above, capable of being run at a higher speed to produce a product with an acceptable surface finish.

It is a further object of the present invention to provide an extrusion die, as above, having a continuous bearing configured specifically for the extrusion profile of the die.

It is another object of the present invention to provide an extrusion die, as above, capable of eliminating die lines on the extrusion surface.

It is still another object of the present invention to provide and extrusion die, as above, having a pocket configured to improve material flow into the die.

It is a further object of the present invention to provide an extrusion die, as above, having a pocket that permits the welding of consecutive billets.

It is still a further object of the present invention to provide an extrusion die, as above, having a pocket of a relatively shallow depth that improves material flow into the die.

It is still a further object of the present invention to provide a strong extrusion die having a relatively small bearing.

It is another object of the present invention to provide an extrusion die, as above, having no undercut to provide strength to the die.

It is yet another object of the present invention to provide a method for designing an extrusion die having the above characteristics.

These and other objects of the invention, as well as the advantages thereof over existing and prior art forms, which will be apparent in view of the following detailed specification, are accomplished by means hereinafter described and claimed.

In general, an extrusion die embodying the concepts of the present invention utilizes an extrusion die, including a body having an upstream face and a downstream face; a pocket formed in the upstream face; an extrusion profile in the body extending from the pocket to the downstream face the depth of the profile defining a bearing; the pocket being of a predetermined configuration dependent on the configuration of the profile so that flow of material through the die is improved. The die is made by the method including the steps of establishing the desired extrusion profile for the die; and from that established profile, determining the configuration of a pocket surrounding the extrusion profile such that material flow through the die is improved.

To acquaint persons skilled in the arts most closely related to the present invention, one preferred embodiment of a solid extrusion die, and one embodiment of a hollow die, that illustrate a best mode now contemplated for putting the invention into practice are described herein by, and with reference to, the annexed drawings that form a part of the specification. The exemplary extrusion dies are described in detail without attempting to show all of the various forms and modification in which the invention might be embodied. As such, the embodiments shown and described herein are illustrative, and as will become apparent to those skilled in these arts can be modified in numerous ways within the spirit and scope of the invention; the invention being measured by the appended claims and not by the details of the specification.

DESCRIPTION OF THE PREFERRED EMBODIMENTS

Figure 1:
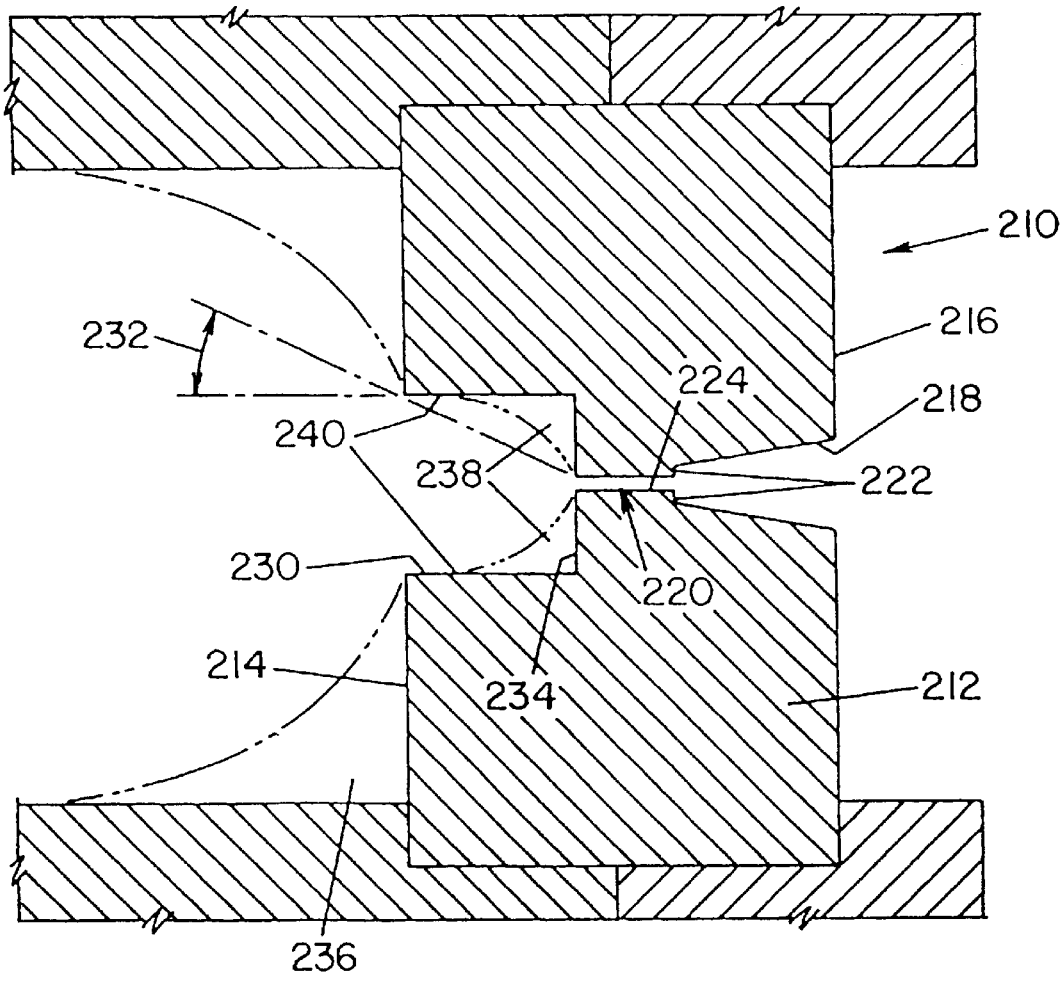
FIG. 1 (PRIOR ART)
FIG. 1 is a sectional side view of a typical prior art extrusion die.
Figure 2:
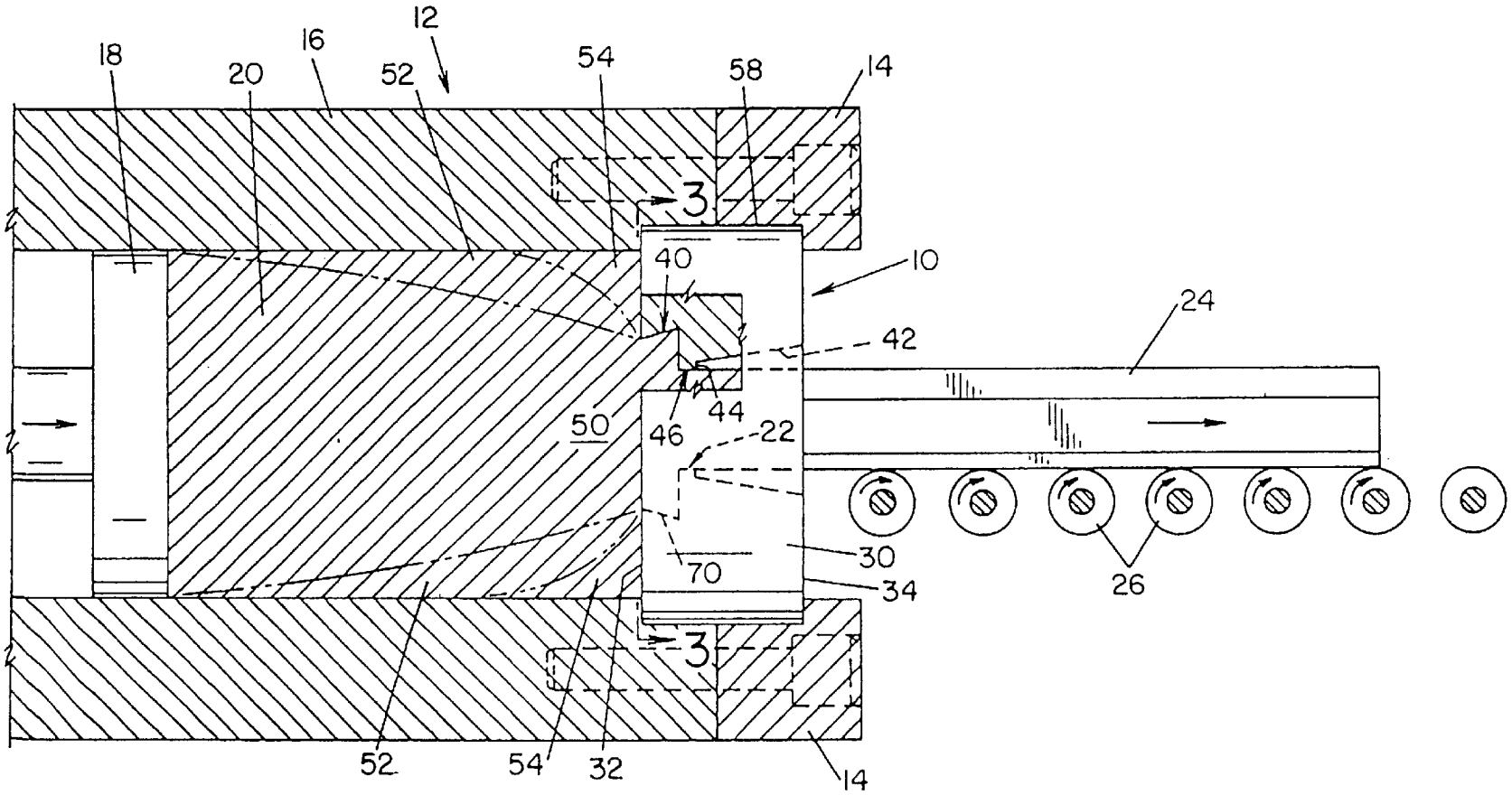
FIG. 2 is a side view partially in section of a typical extrusion processor having an extrusion die according to the present invention.

One representative form of an extrusion die embodying the concepts of the present invention is designated generally by the numeral 10 on the accompanying drawings. In FIG. 2, the representative extrusion die 10 is depicted in an extrusion processor 12. The die 10 is clamped against the processor 12 by a plurality of clamps 14 that are bolted to the main body 16. The processor 12 includes a ram 18 that is operable to push a billet 20 of extrusion material towards the die 10. The force created by the ram 18 pushes the material 20 through an extrusion profile 22 cut through the die 10. The material 20 emerges from the die 10 as an extruded product 24 having a cross section matching the extrusion profile 22. The product 24 emerging from the die 10 may be supported by a plurality of rollers 26 as depicted in FIG. 2.

An extrusion die 10 according to the present invention includes a main body portion 30 having an upstream face 32 and a downstream face 34 with an extrusion profile 22 cut therethrough. It is to be noted that the shape of the extrusion profile 22 depicted in the figures is merely exemplary and that the concepts of the present invention apply to dies 10 having other extrusion profiles. The extrusion profile 22 is surrounded by a pocket 40 that permits welding of consecutive billets 20 and improves material flow into the die 10. An angled undercut cavity 42 extends into the main body portion 30 of the die 10 from the downstream face 34 of the die. An undercut 44 that is generally parallel to the upstream 32 and downstream 34 faces of the die 10 may extend between the angled undercut cavity 42 and the extrusion profile 22.

Figure 3:
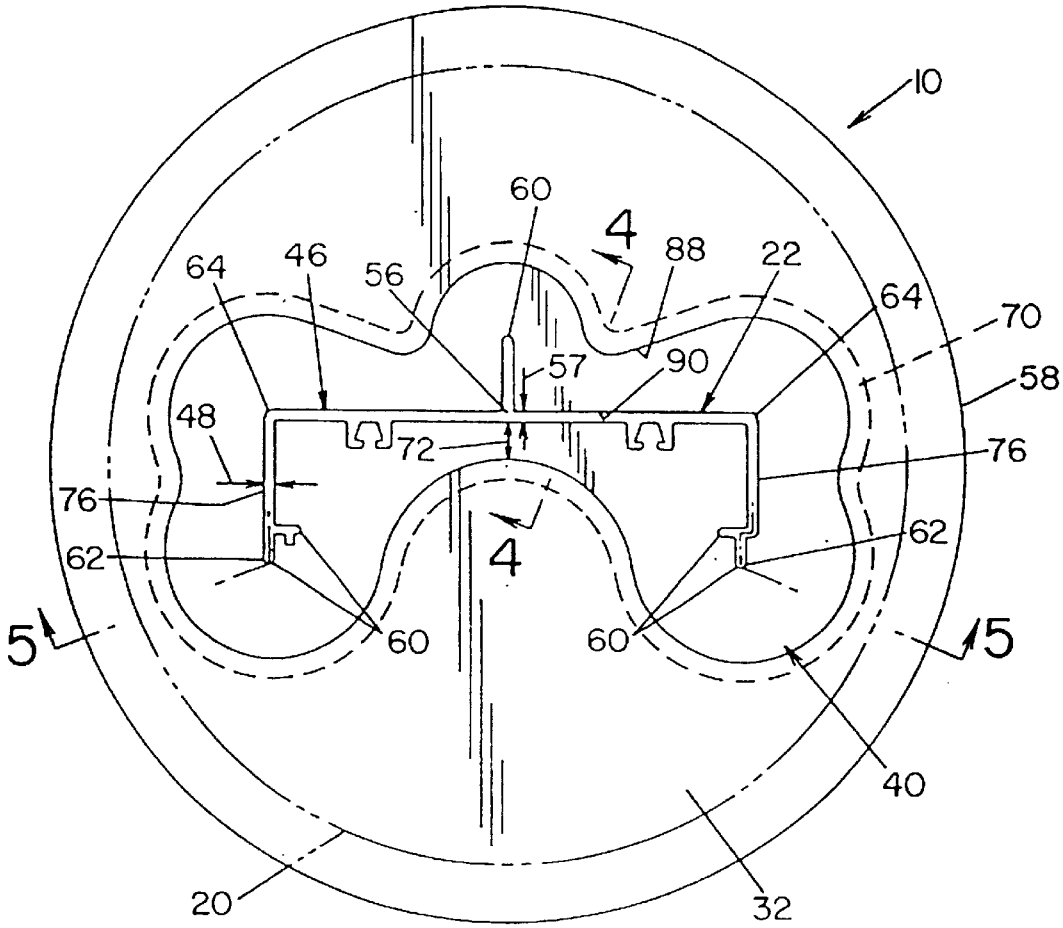
FIG. 3 is taken along line 3—3 in FIG. 2 and depicts the front view of the extrusion die according to the present invention.

The depth of the extrusion profile 22 is referred to in the art as the die land or the die bearing 46. In the past, the length of the bearing 46 was exclusively used to control the material flow through the die 10. Thus, it is known that a small bearing 46 allows faster flow and a longer bearing 46 slows the flow of material 20 through the die 10. These results are chiefly the result of the friction created between the flowing material and the bearing 46. In order to create a die 10 that may be run at a fast extrusion speed. It is necessary to limit the length of the bearing 46 as much as possible. However, in a relatively complex extrusion profile 22, such as the extrusion profile depicted in the drawings, the material flow through the profile 22 is not uniform. In areas of the profile 22 where the wall thickness of the extrusion profile 22 is small, the limited size of the opening limits the flow of the material through the profile 22. It should be noted for clarity that the term wall thickness refers to the wall thickness of the extrusion profile 22 as indicated by the numeral 48 on FIG. 3. Thus when a uniform bearing 46 is used with such a profile 22, the material flows faster through certain areas of the profile 22 than others. Such variable flow leads to products 24 having unacceptable product dimensions, such as twisting along the longitudinal axis of the product.

To control the material flow, the present invention in part utilizes a continuous bearing 46 having a length that varies in accordance with the wall thickness of the extrusion profile 22 and location of that wall thickness with respect to the material flow. It is known that the material flow encounters the least amount of friction at the center of the flow, as indicated by the numerical 50, and the most friction at the edges of the flow, as indicated by the numeral 52. The geometry is such that a dead area 54 is formed where the material flow contacts the upstream face 32 of the die 10. The bearing 46 of the present invention is designed to anticipate the variable material flow and control the flow through the die 10.

To design the bearing 46, the die designer first determines the fastest and slowest areas of the extrusion profile 22. The fastest area of the profile 22 will generally be the area having the largest wall thickness that is closed to the center of the die 10. However, those persons skilled in the art of die design can generally recognize various factors that may move the faster area away form the center of the die. In the extrusion profile 22 depicted in the drawings, the fastest area of the extrusion profile 22 is indicated by the numeral 56. This location is fastest because it is at the center of the die 10 and has a wall thickness 57 that is approximately as large as the other wall thicknesses, such as indicated by the numeral 48. The slowest area of the extrusion profile 22 will generally be that area of the extrusion profile 22 that is closest to the edge 58 of the die and is an end 60 or an area having a narrow wall thickness. In the extrusion profile 22 depicted, the slowest areas are indicated by the numeral 62.

To control the material flow through the die 10, the bearing 46 is adjusted to be longest at the fastest area 56 and shortest at the slowest area 62. As explained above, a short bearing 46 will increase the flow rate through the die 10 while a long bearing 46 will slow the flow rate through the die 10. The designer next determines the minimum bearing 46 that may be practically formed for the die 10 being designed. The length of the minimum bearing 46 depends on various factors including the strength of the die material, the pressure and temperature of the extrusion process, and the fabrication capabilities available to the die designer. The designer sets the minimal bearing 46 at the slowest area 62 of the profile, as may be seen in FIG. 5.

The designer then determines the length of the bearing 46 at the fastest area 56 of the extrusion profile 22. If the wall thickness of the extrusion profile 22 at the fastest area 56 is approximately equal to the wall thickness of the extrusion profile 22 at the slowest area 62, the length of the bearing 46 at the fastest area 56 is equal to the length of the bearing 46 at the slowest area 62 multiplied by a number in the approximate range of 1.4 to 2.0. Thus, the length of the bearing 46 at the fastest area 56 is always greater than the length of the bearing 46 at the slowest area 62.

In the following examples, the numerous selected for the length of the bearings 46 and for the various wall thicknesses are exemplary in nature and are intended only to demonstrate how the method of determining the bearing 46 is accomplished. The numbers defining the various approximate ranges have, however, been discovered by the inventor to be useful for achieving the results of the present invention.

An example of calculating the bearing is given below for the extrusion profile 22 depicted in the drawings having the given exemplary dimensions. First the designer determines the minimum possible bearing that may be created in the die 10. If the minimum bearing 46 length is determined to be 0.4 units, the bearing 46 at the fastest area 56 would be 0.4 units multiplied by a number in the approximate range of 1.4 to 2.0. If the number 1.6 were arbitrarily selected for the purpose of this example, the length of the bearing 46 at the fastest area 56 would be 0.4*1.6=0.46 units.

If the wall thickness is larger at the fastest area 56 than at the slowest area 62, the approximate range of 1.4 to 2.0 is increased by a first factor. The first factor is determined by multiplying the ratio of the wall thickness at the fastest area 56 to the wall thickness at the slowest area 62 by a number in the approximate range of 1.25 to 1.65. Thus, if the wall thickness at the slowest area 62 is 1.4 units and the wall thickness at the fastest area 56 is 1.6 units, the ratio is 1.14. (1.6 divided by 1.4) The first factor is thus 1.14 multiplied by a number in the approximate range of 1.25 to 1.65. If 1.45 were selected, the first factor would be 1.14*1.45=1.65. The approximate range is thus increased by 1.65. Therefore, the ratio of the bearing length at the fastest area 56 over the length of the slowest area 62 falls into the approximate range of 2.31 to 3.3 (1.4*1.65 to 2.0*1.65) Thus, the length of the bearing at the fastest area 56 of the extrusion profile would be 0.4 units (the length of the bearing at the slowest area 62) multiplied by a numeral in the approximate range of 2.31 to 3.3. If the numeral 2.7 were selected, the length of the bearing at the fastest area 56 would be 0.4*2.7=1.08.

If the wall thickness is smaller at the fastest area 56 than at the slowest area 62, the approximate range of 1.4 to 2.0 is decreased by a second factor. The second factor is determined by multiplying the ratio of the wall thickness at the slowest area 62 to the wall thickness at the fastest area 56 by a number in the approximate range of 1.25 to 1.65.

Thus, if the wall thickness at the slowest area 62 is 1.4 units and the wall thickness at the fastest area 56 is 1.2 units, the ratio is 1.7. (1.4 divided by 1.2) The second factor is thus 1.17 multiplied by a number in the approximate range of 1.25 to 1.65. If 1.45 were selected, the second factor would be 1.17*1.45=1.70. The approximate range is thus decreased by 1.70. Therefore, the ratio of the bearing length at the fastest area 56 over the length of the slowest area 62 falls into the approximate range of 0.82 to 1.18 (1.4/1.7 to 2.0/1.7). Thus, the length of the bearing at the fastest area 56 of the extrusion profile would be 0.4 units (the length of the bearing at the slowest area 62) multiplied by a numeral in the approximate range of 0.82 to 1.18. If the numeral 1.1 were selected, the length of the bearing 46 at the fastest area 56 would be 0.4 units *1.1=0.44 units.

Figure 5:
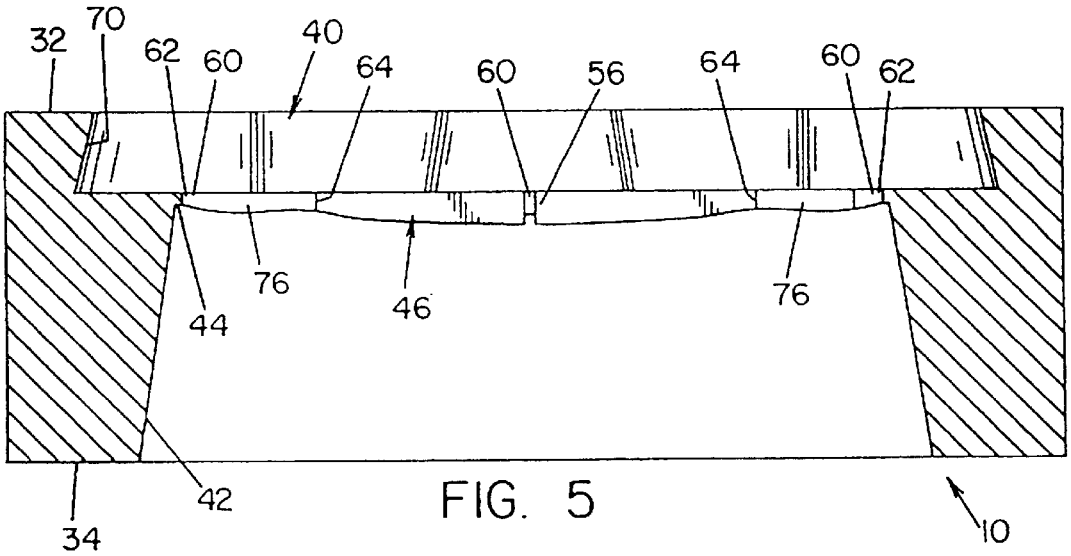
FIG. 5 is a cross section taken along line 5—5 in FIG. 3 and depicts a side view of the continuous bearing of the extrusion die.

For points on the extrusion profile 22 between the fastest area 56 and the slowest area 62, the bearing lengths are interpolated from the known values. If the wall thickness of the extrusion profile 22 is generally constant from the fastest area 56 to the slowest area 62, the bearing length is simply linearly interpolated. When this method is used, the bearing length appears as is shown in FIG. 5. In FIG. 5, the bearing 46 is shortest at the slowest areas 62 and is longest at the fastest area 56.

For points along the extrusion profile 22 that have a wall thickness different from the wall thickness at the fastest area 56, the bearing size determined from the linear interpolation is adjusted by a third factor. Where the wall thickness is greater than the fastest area 56, the bearing size is increased by a factor between 1.25 to 1.65 times the ratio of wall thickness at that point to the wall thickness at the fastest area 56. If the wall thickness at that point is less than the wall thickness that of the fastest area 56, the bearing length of decreased by a fourth factor. The fourth factor is between 1.25 to 1.65 times the ratio of the wall thickness at the fastest area 56 to the wall thickness at that point. Once the bearing lengths are adjusted for the wall thickness discrepancies, the bearing 46 is interpolated again to take into account the new lengths.

Lastly, the bearing lengths are adjusted based on the geometry of the extrusion profile 22. If the point is located at an end point 60 of the extrusion profile 22, the bearing length is decreased by 30 to 50 percent. Similarly, if the point is located at a corner, such as the corner indicated by the numeral 64, the length of the bearing 46 is decreased by 10 to 30 percent. After the adjustment for the geometry are made, the overall lengths are interpolated again to determine the final bearing lengths for all points in between those specifically calculated points. By following these steps, a die designer may determine a continuous bearing 46 configured specifically for the chosen extrusion profile 22. The continuous bearing 46 controls the flow of material through the die 10 and works to equalize the effects of friction on the material flow. Furthermore, by minimizing the length of the bearing 46 at the slowest areas 62 of the extrusion profile 22, the method has insured that the extrusion processor 12 may be fun as fast as the extrusion profile 22 will allow.

The bearing 46 described above is most effective when employed in conjunction with a pocket 40 according to the present invention. A pocket 40 may be seen in the drawings as being a cavity in the upstream face 32 of the die 10 generally surrounding the extrusion profile 22. The pocket 40 may either be carved into the die body 30 or be formed in a plate (not shown) which would be positioned adjacent the upstream face 32 of the die 10. The pocket 40 has a continuous tapered sidewall 70 that permits consecutive billets 20 to be welded together in conjunction with the die 10. The walls 70 are tapered between 0 to 30 degrees.

The tapered sidewall 70 enables the welding of consecutive billets even though the depth 74 of the pocket 40 is generally less than the prior art. As described above in the Background of the Invention section, welding consecutive billets is often desirable. To weld two billets, the first billet is cut when the ram 18 approaches the upstream face 32 of the die 10. The act of cutting creates a force that urges the material 20 left in the pocket 40 back out of the pocket 40. In the past, the walls 70 of the pocket 40 were simply extended so that the force could not pull the material 20 all of the way out. In the present invention, the walls 70 of the pocket 40 are tapered to help retain the material 20 in the pocket 40 when the billet is cut. As such, when the cutting action creates a force, the walls 70 act to counter this force. Thus, the depth 74 of the pocket 40 does not have to be as deep as the prior art and the depth is substantially decreased because the material is retained by the tapered walls 70.

The pocket 40 is also configured to improve the material flow into the die 10 by changing the angle of material flow into the extrusion profile 22. In the prior art, the material 20 would be pushed directly against the upstream face 214 of the die 210 and then would be forced around sharp corners into the extrusion profile 220. But, in the present invention, the pocket 40 starts to bend the flow lines of the material 20 before it reaches the upstream face 32 thus creating an artificial material entry angle. The artificial angle improves the flow of the material 20 such that it may flow more freely into the extrusion profile 22 which reduces the material strain rate, smoothes the material flow, and equalizes the pressure of the material flow. The material flow lines, and thus the material flow, is improved with a pocket 40 because the configuration (depth and width) of the pocket 40 is designed to anticipate the material flow path and the material entry angle. In the prior art, the depth of any pocket is much deeper and the material entry angle, or pocket angle, is always less than 45 degrees, resulting in large amounts of friction being generated. The large amount of friction results in poor surface finishes and poor overall quality. When the material flow lines are directed with a pocket 40 of the present invention, the amount of the friction created between the material 20 and the die 10 is greatly reduced allowing the extrusion processor 12 to be run at increased speeds while providing a high quality product.

In addition to the benefit of faster extrusion speed, the pocket 40 allows the die designer to make adjustment to the die 10 without adjusting the bearing 46. Because of the location and size of the bearing 46, it is often difficult to adjust the bearing 46 once it has been formed. On the other hand, the pocket 40 is relative easy to alter after it has been formed. During the die 10 test procedure, if the die designer desires to change the affect of the die 10 on the material flow, the designer may either carve more of the pocket 40 out or, unlike changes to the bearing 46, may add material back to the pocket 40. Adding material to the pocket 40 is possible by simply welding material into place and grinding it down to be smooth.

In general, the dimensions of a pocket 40 are determined by the anticipated speed of material flow at the point along the extrusion profile 22 being determined. For instance, when the point is in a slow flow area, the pocket width will be larger than if the point to be determined is at a fast area of flow. A pocket 40 for an extrusion profile 22 is determined by first setting a minimum width 72 at the fastest area 56 of the extrusion profile 22. The minimum width 72 may be determined from the designer's skill in the art and the overall dimension of the extrusion profile 22 with respect to the diameter of the die 10. The depth 74 of the pocket 40 is then determined by multiplying the minimum width 72 by a number in the approximate range of 1.2 to 2.0.

The selection of the minimum width is limited, however, by the desire to form a pocket 40 that is configured such that the pocket angle 82 formed by the reference line 84 and the reference line 86 is in the approximate range of 25 degrees to 45 degrees. Reference line 84 extends perpendicular to the upstream surface 32 through the edge 88 of the pocket 40. Reference line 86 extends through the edge 88 of the pocket 40 to the edge 90 of the extrusion profile 22 directly behind that point on the edge of the pocket 40. In general, when the pocket angle 82 is small, the pocket 40 slows the flow. However, when the pocket angle 82 is large, the flow encounters little friction and is fast. The pocket angle 82 is varied by varying the pocket width because the pocket depth 74 is fixed.

The designer then determines the width of the pocket 40 at the points 76 along the extrusion profile 22 that are closest to the edge 58 of the die 10. For these points 76, the pocket width is the minimum pocket width 72 multiplied by a number in the approximate range of 1.5 to 2.5. The pocket 40 is larger at these points 76 because the friction between the material flow and the extrusion processor slows the material flow. Next, the designer further increases the width of the pocket 40 for those points along corners 64 or endpoints 60. The width for these points 60 and 64 is further increased by a number in the approximate range of 1.2 to 2.0. At the slow areas, the pocket angle is desirably in the approximate range of 45 degrees to 70 degrees. After pocket widths for these points are determined, the overall pocket 40 layout is determined by linear or higher order interpolations.

Thus, for the areas of the extrusion profile 22 that are slow, the width of the pocket 40 is large. These areas also have the smallest bearing 46 so that less friction is created in the die 10. Those areas of the extrusion profile 22 that are fast have the small pocket width. The fast areas also have the long bearing 46. The combination of the bearing 46 and the pocket 40 allows the die designer to create a die 10 that improves the material flow. Once the material flow is improved, the material flows evenly through the die 10 resulting in an improved product 24 having improved material properties and a satisfactory surface finish. The improved material flow also reduces friction in the die 10 thus permitting the speed of the extrusion through the die 10 to be increased. E3y following the method of the present invention, the number of attempts to create a die 10 forming a satisfactory product is reduced from approximately 3 to approximately 1. The number of attempts is reduced because the die bearing 46 and pocket 40 have been specifically configured based on the extrusion profile 22 in that die 10.

Figure 6:
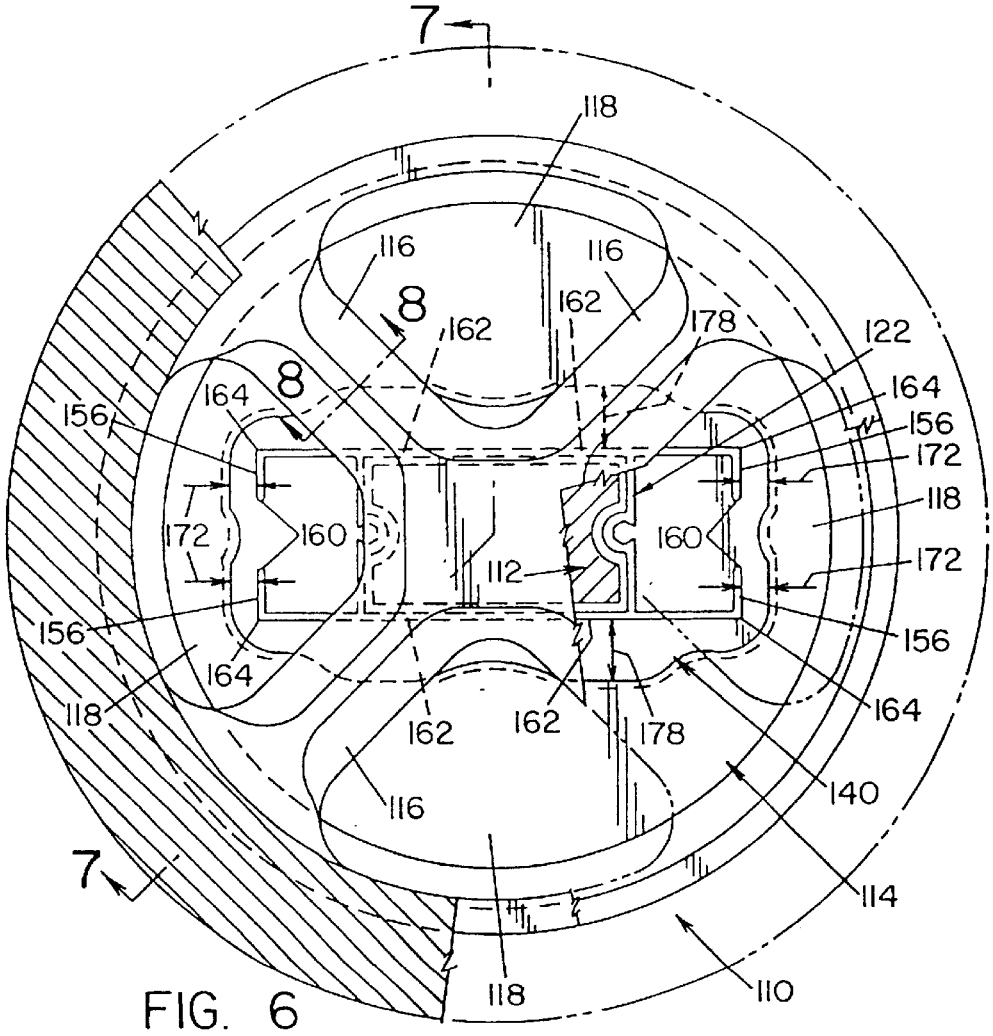
FIG. 6 is an end view of a hollow extrusion die according to the present invention.
Figure 7:
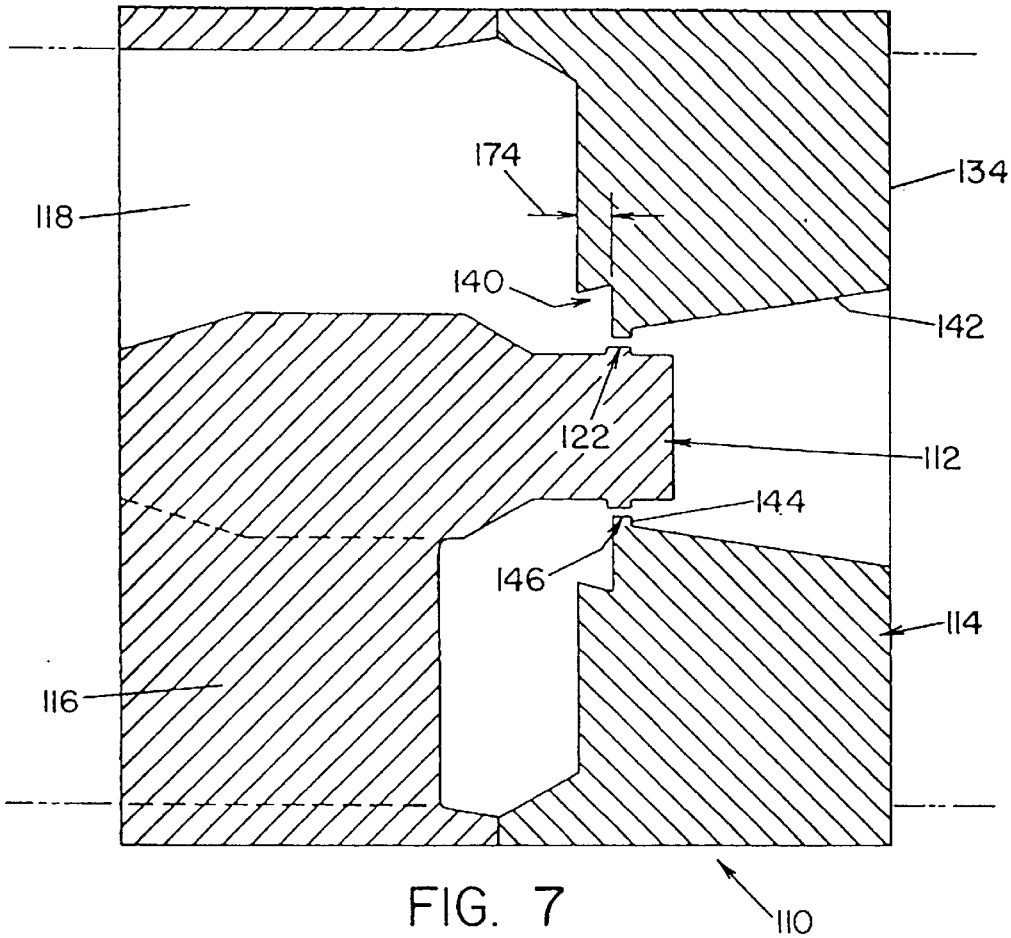
FIG. 7 is a sectional view of the hollow die taken along line 7—7 in FIG. 6.
Figure 8:
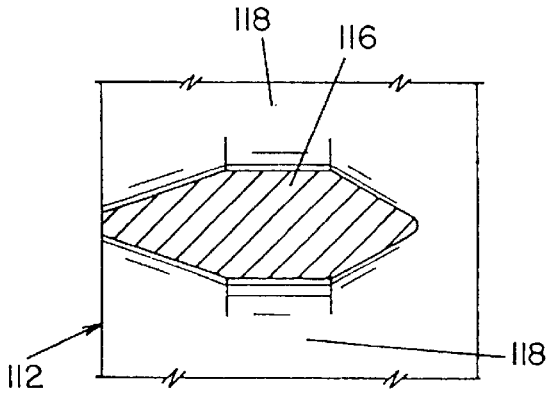
FIG. 8 is a sectional side view of a web taken along line 8—8 in FIG. 6.

The foregoing description has been directed toward a solid die 10. The present invention also is useful for increasing the speed of a hollow extrusion die 110. A typical hollow extrusion die 110 is depicted in FIGS. 6–8. A hollow die 110 is used to form products such as a tube that have a hollow portion. A hollow die 110 has a male die 112 that is disposed in a female die 114. A plurality of webs 116 support the male die 112 in the female die 114. The openings that permit material to flow around the webs 116 supporting the male die 112 are referred to in the art as poles and are indicated by the numeral 118 on the accompanying drawings. The space between the male die 112 and the female die 114 is the extrusion profile 122.

The female die 114 of the hollow die 110 has similar elements of the solid die 10. For instance, the hollow die 110 may be placed in the same type of extrusion processor 12 as the solid die 10. The hollow die 110 also has an undercut cavity 142 extending into the downstream face 134. The hollow die 110 also utilizes a pocket 140 to manage the material flow into the extrusion profile 122. An undercut 144 extends between a bearing 146 and the undercut cavity 142.

In general, the length of the bearing 146 will increase from the center of a web 116 in the direction of the center of a pole 118. The bearing length is smallest under the webs 116 because the material must flow around each web 116 to reach the extrusion profile 122 as may be seen in FIGS. 7 and 8. Thus, the bearing 146 is shortest under the webs 116 so that the material will encounter less friction in the extrusion profile 122 at these locations than in those locations that are directly under the poles 118 where the material flows directly into the extrusion profile 122.

As with the solid die 10 design, the designer first determines the shortest bearing that is reasonably possible to manufacture. The designer sets this the minimum bearing to be the bearing length at the slowest areas of the extrusion profile 122 which are those points 162 directly under the webs 116. The designer then determines the length of the bearing 146 at the fastest area 156 of the die 110 (those areas directly under poles with the largest wall thickness) to be the minimum bearing length multiplied by a number in the range of 1.11 to 1.67. The length of the bearing for the points in between those points is determined by interpolation. Additionally, the rules for adjusting the bearing 146 based on wall thickness and geometry also apply. Thus, if the point to be determined is along a corner, such as indicated by the numeral 164, the bearing will be decreased by 10 to 30 percent. If the point to be determined is disposed at an endpoint 160 of the extension profile 122, the bearing length is decreased by 30 to 50 percent.

In general, the determination of the size of the pocket 140 for a hollow die 110 follows the same types of rules used to determine the pocket widths for the solid die 10. In a hollow die 110 configuration, the pocket width increases when it is under a web 116 and decreases when it is under a pole 118. The designer first determines a minimum pocket width based on his experience and the relative size of the extrusion profile 122 with respect to the die 110. The minimum pocket width 172 is placed at the fastest areas 156 of the extrusion profile 122, typically directly under a pole 118. The pocket depth 174 is then calculated to be approximately 1.2 to 2.0 times the minimum width 172. Again, the pocket angle for the fastest area should be in the approximate range of 25 degrees to 45 degrees.

The designer then calculates the pocket width 178 for the slowest area 162 of the extrusion profile 122. The slowest area 162 is an area of the extrusion profile 122 having a small wall thickness that is directly under a web 116. The width of the pocket 140 at these points is 2.0 to 5.0 times the minimum width. However, it is desired that the pocket angle at the slowest areas be in the approximate range of 45 degrees to 70 degrees. Again, the pocket widths for the remaining points may be calculated from linear or higher order interpolations. In addition, the widths may be increased or reduced based on the geometry of the extrusion profile 122. Thus, a tight corners 164, the width may be increased while at open areas, the width may be decreased.

Figure 4:
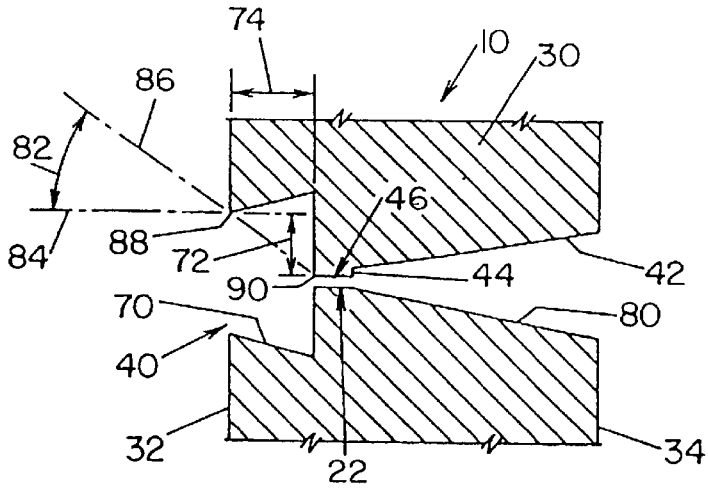
FIG. 4 is taken along line 4—4 in FIG. 3 and depicts a partial cross section of the extrusion die according to the present invention.

For either a solid die 10 or a hollow die 110, after the bearing 46 and 146 and pocket 40 and 140 dimensions have been determined, the dimensions may be given to computer-controlled manufacturing machines that are designed to cut a die by following a programmed tool path. As such, the machines can be operated to cut the extrusion profile 22 and 122 into the dies 10 and 110 with or without the undercut 44 and 144. In general a die without an undercut 44 and 144 is stronger than die having an undercut 44 and 144. The die without the undercut 44 and 144 is significantly stronger than a die having an undercut 44 and 144 even though the bearing 46 and 146 of the die may be significantly shorter. FIG. 4 depicts the die 10 having one half formed with the undercut 44 shown in FIG. 2 and one half shown without an undercut 44. The half without the undercut 44, indicated by the numeral 80 is more resistant to the bending forces of the material being forced through the extrusion profile 22. The pocket 40 and 140 may also be formed by programming a tool path into an appropriate machine. The tool path for the bearing 46 and 146 may be determined by knowing the angle of the cutting wire for the cutting machine and the depth of the pocket 40 and 140.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that an extrusion die embodying the concepts of the present invention is capable of increasing the extrusion speed while producing an acceptable product, but also that the other objects of the invention can be likewise accomplished.

We claim:

1. An extrusion die, comprising: a body having an upstream face and a downstream face; a pocket formed in said upstream face; an extrusion profile in said body extending from said pocket to said downstream face, the depth of said profile defining a bearing having a length; said pocket being of a predetermined configuration dependent on the configuration of said profile so that the flow of material through the die is improved; said extrusion profile having [slow] *fast* areas defined by areas of greatest bearing length and [fast] *slow* areas defined by areas of least bearing length; said pocket having a width; said width of said pocket being smallest at the fastest area of the extrusion profile and said width of said pocket being largest at the slowest area of said extrusion profile.

2. An extrusion die according to claim 1, wherein said body has a tapered undercut cavity in said downstream face, said extrusion profile passing through said body from said pocket to said undercut cavity; said bearing extending directly to said undercut cavity.

3. An extrusion die according to claim 2, further comprising and undercut, said undercut extending between said bearing and said undercut cavity.

4. An extrusion die according to claim 1, wherein said length of said bearing is dependent on the configuration of said extrusion profile at any given location along the extrusion profile.

5. An extrusion die according to claim 4, wherein said extrusion profile has a wall thickness any given point along said extrusion profile; said length of said bearing at said fastest area of said extrusion profile is in the approximate range of 1.4 to 2.0 times the length of the bearing at said slowest area of said extrusion profile when said wall thickness of said extrusion profile at said fastest area is approximately equal to said wall thickness of said extrusion profile at said slowest area.

6. An extrusion die according to claim 5, wherein said approximate range of 1.4 to 2.0 is increased by a first factor when said wall thickness of said extrusion profile at said fastest area is larger than said wall thickness of said extrusion profile at said slowest area.

7. An extrusion die according to claim 5, wherein said approximate range of 1.4 to 2.0 is decreased by a second factor when said wall thickness of said extrusion profile at said fastest area is smaller than said wall thickness of said extrusion profile at said slowest area.

8. An extrusion die according to claim 1, wherein said pocket has tapered sidewalls.

9. An extrusion die according to claim 1, wherein said pocket has a depth equal to said width of said pocket at said fastest area multiplied by a number in the approximate range of 1.2 to 2.0.

10. An extrusion die according to claim 9, wherein said pocket has a pocket angle at any given point along said extrusion profile; said width of said pocket at said fastest area creating a pocket angle in the approximate range of 25 degrees to 45 degrees.

11. An extrusion die according to claim 9, wherein said pocket has a pocket angle at any given point along said extrusion profile; said width of said pocket at said slowest area creating a pocket angle in the approximate range of 45 degrees to 70 degrees.

12. An extrusion die, comprising:

a body having an upstream face and a downstream face and a pocket formed in said upstream face;

said body also having an extrusion profile formed in said body extending from said pocket to said downstream face, the depth of said profile defining a bearing having a length;

said extrusion profile having [slower] *faster* areas defined by areas of greater bearing length and [faster] *slower* areas defined by areas of lesser bearing length; said pocket having a width; and said width of said pocket being smaller at said faster areas of said extrusion profile than said width of said pocket at said slower areas of said extrusion profile.

13. The extrusion die of claim 12, wherein said pocket has tapered sidewalls.

14. The extrusion die of claim 12, wherein said extrusion profile has at least one [slowest] *fastest* area defined by the areas of greatest bearing length and at least one [fastest] *slowest* area defined by the areas of least bearing length; said pocket having a width; said width of said pocket being smallest at the fastest areas of the extrusion profile and said width of said pocket being largest at the slowest areas of said extrusion profile.

15. The extrusion die of claim 14, wherein said pocket has a depth equal to said width of said pocket at said fastest areas multiplied by a number in the approximate range of 1.2 to 2.0.

16. The extrusion die of claim 12, wherein said pocket has a pocket angle at any given point along said extrusion profile; said width of said pocket at said faster areas creating a pocket angle in the approximate range of 25 degrees to 45 degrees.

17. The extrusion of claim 12, wherein said pocket has a pocket angle at any given point along said extrusion profile; said width of said pocket at said slower areas creating a pocket angle in the approximate range of 45 degrees to 70 degrees.

* * * * *